United States Patent [19]

Muth et al.

[11] 4,003,466

[45] Jan. 18, 1977

[54] CONVEYOR FOR STAGGERING ADJACENT LANES OF PRODUCT

[75] Inventors: William R. Muth, Westmont; Stephen J. Pawela, Wood Dale; Richard G. Wood, Blue Island, all of Ill.

[73] Assignee: Velten & Pulver, Inc., Chicago Ridge, Ill.

[22] Filed: May 9, 1975

[21] Appl. No.: 575,935

[52] U.S. Cl. .............................. 198/452; 198/459; 198/779; 198/792
[51] Int. Cl.² .......................................... B65G 47/26
[58] Field of Search ........... 198/32, 34, 183, 127 R

[56] References Cited
UNITED STATES PATENTS 3,774,748  11/1973  Dederer et al. ................. 198/32
3,894,627  7/1975  Jabbusch et al. ................. 198/34

*Primary Examiner*—Evon C. Blunk
*Assistant Examiner*—Douglas D. Watts
*Attorney, Agent, or Firm*—Prangley, Dithmar, Vogel, Sandler & Stotland

[57] ABSTRACT

Apparatus for staggering product delivered to multiple product lanes. A merging conveyor receives the staggered product from the product lanes and merges the product into a single lane.

A split conveyor is disclosed in which alternate groups of product positioning supports and product conveying supports position and convey the product in staggered relation to a merging conveyor for merging into a single lane without product accumulation.

8 Claims, 4 Drawing Figures

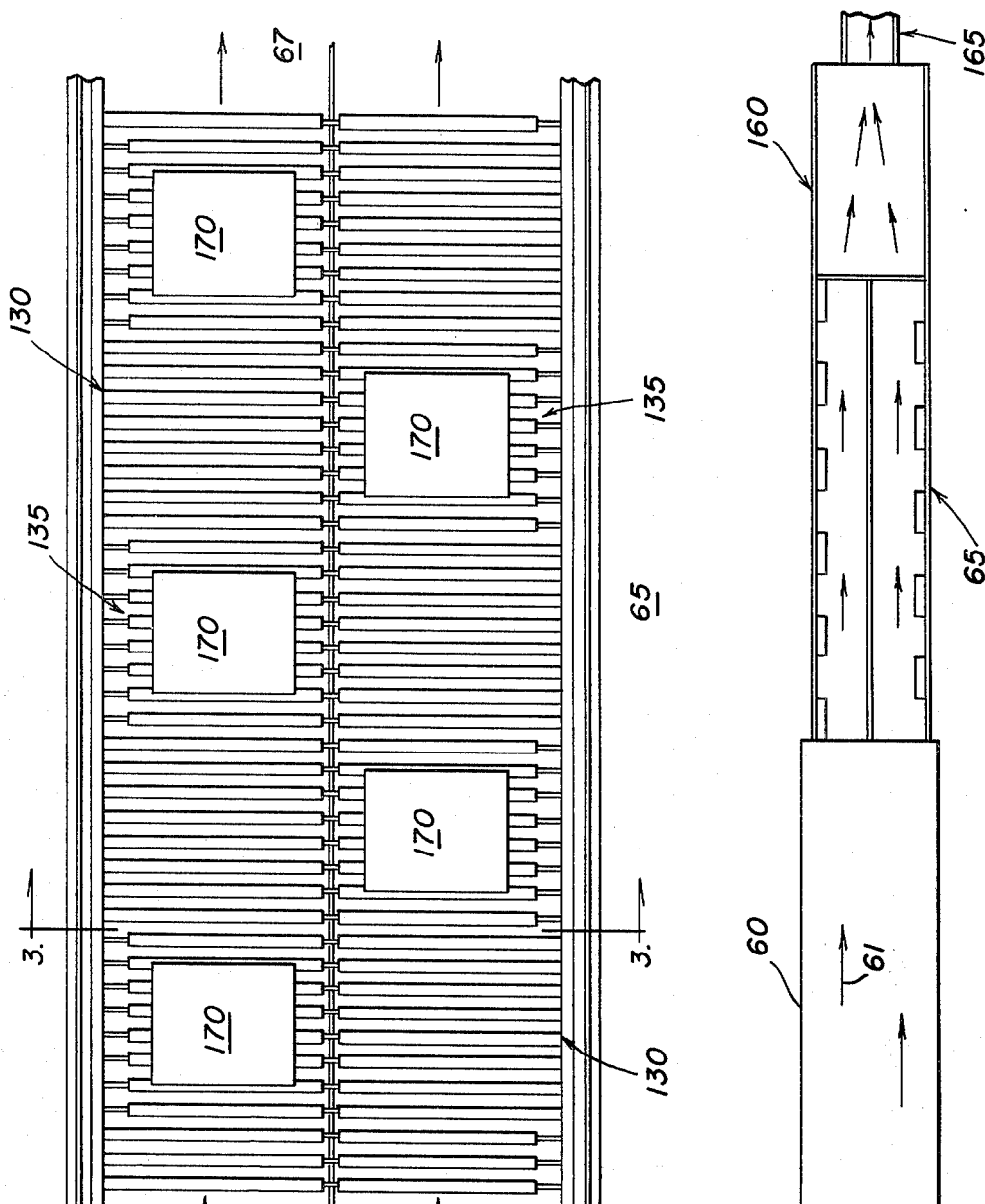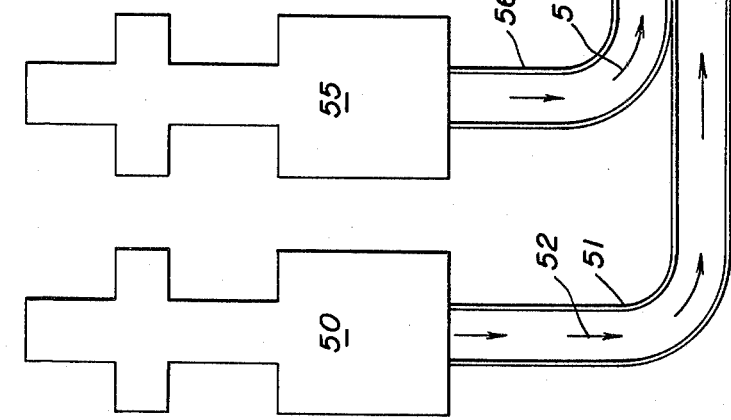

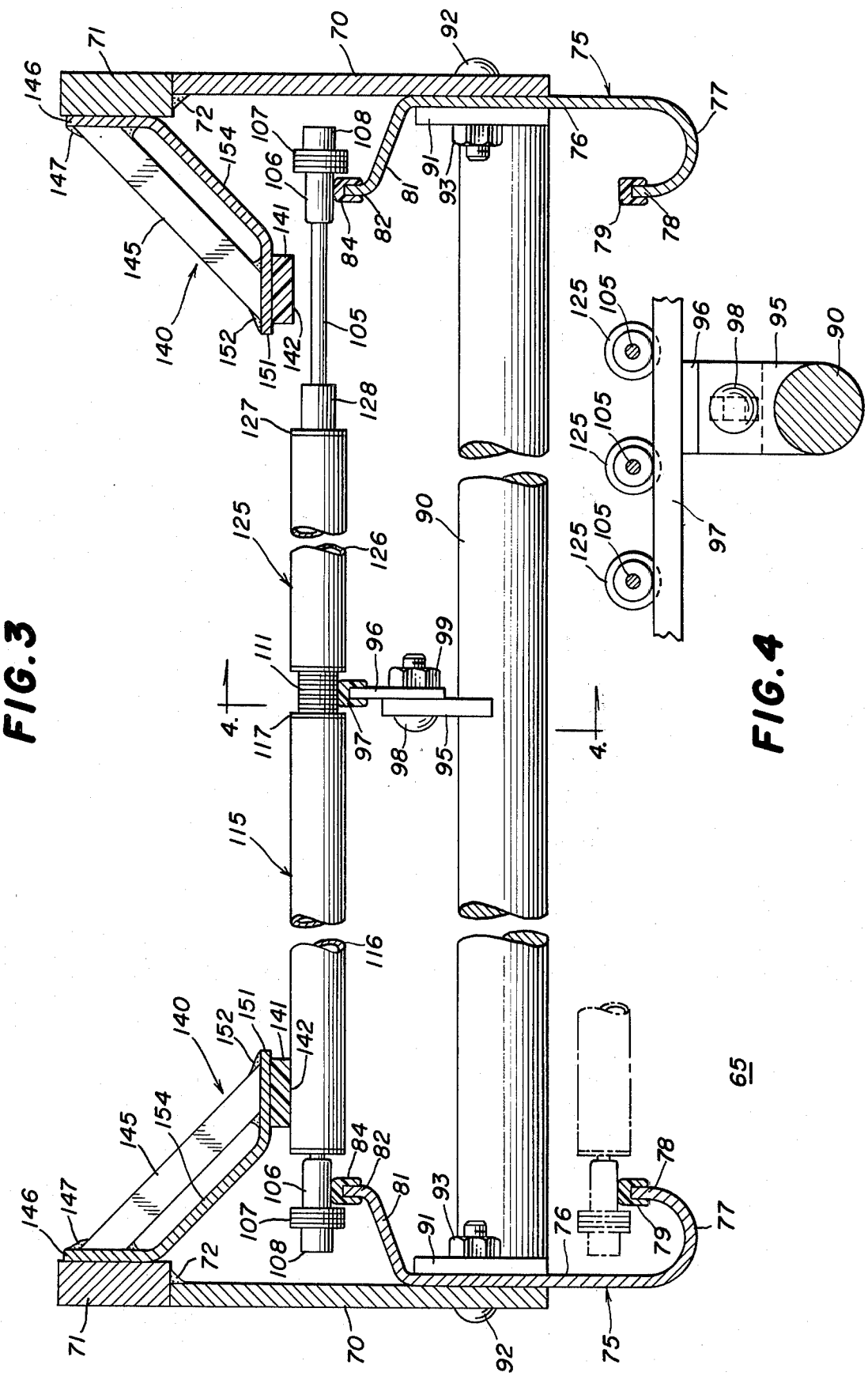

CONVEYOR FOR STAGGERING ADJACENT LANES OF PRODUCT

BACKGROUND OF THE INVENTION

It is often necessary to combine multiple lanes of product into a single lane without allowing the product to accumulate and come into contact with each other. Heretofore mechanisms have been available for combining product lanes but all mechanisms involve the accumulation of the product at some point in the system. This is undesirable if the product is easily damaged or if for some other reason it is necessary to maintain the product intact and separate from other product.

The present invention provides apparatus wherein product may be received from multiple product lanes and is staggered for delivery to a merging conveyor. The staggered product is then delivered to a merging conveyor which merges the product into a single lane without product accumulation while maintaining the individual product items separate.

SUMMARY OF THE INVENTION

This invention relates to a system for merging multiple product lanes into one and to apparatus for staggering product delivered to multiple adjacent product lanes and more particularly, to apparatus wherein product lanes contain groups of product positioning supports and product carrying supports.

It is an important object of the present invention to provide apparatus for staggering product delivered to multiple product lanes to deliver product sequentially from multiple product lanes to a merging conveyor for merging the product into a single lane without product accumulation.

Another object of the present invention is to provide apparatus for staggering product delivered to multiple adjacent product lanes, the apparatus comprising a plurality of longitudinally extending product lanes each comprised of groups of product carrying supports and groups of rotatable product positioning supports forming an endless conveyor having an infeed end and an outfeed end, each group of product carrying supports being transversely aligned with at least one group of product positioning supports, and mechanism for rotating the product positioning supports to position product onto an adjacent group of product carrying supports, whereby product fed onto a group of the product positioning supports is transported thereby to an adjacent group of product carrying supports for transport thereon to the outfeed end and product fed onto a group of the product carrying supports is transported thereon to the outfeed end, the product carrying supports delivering product to the outfeed end sequentially from each product lane.

A further object of the present invention is to provide a system of the type set forth wherein friction means contacts the product positioning supports to rotate the supports to position product on an adjacent group of product carrying supports.

A still further object of the present invention is to provide a system for combining multiple lanes of product into a single lane of product while maintaining the product support, the system comprising a plurality of longitudinally extending product lanes each comprised of groups of product carrying supports and groups of rotatable product positioning supports forming an endless conveyor having an infeed end and an outfeed end, each group of product carrying supports being transversely aligned with at least one group of product positioning supports, mechanism for rotating the product positioning supports to position product onto an adjacent group of product carrying supports, whereby product fed onto a group of product positioning supports is transported thereby to an adjacent group of product carrying supports for transport thereon to the outfeed end and product fed onto a group of the product carrying supports is transported thereon to the outfeed end, the product carrying supports delivering product to the outfeed end sequentially from each product lane, and a merging conveyor for receiving the sequentially delivered product from the plurality of product lanes and for combining the sequentially delivered product into one lane.

These and other objects of the present invention together with further objects and advantages thereof will best be understood by reference to the following specification taken in connection with the accompanying drawings:

BRIEF DESCRIPTION OF THE DRAWINGS

FIG. 1 is a schematic view of the system of the present invention showing the product source, a treatment facility, apparatus for staggering product, a merging conveyor and a single row conveyor;

FIG. 2 is a top plan view of the product positioning conveyor of the present invention showing the staggered product thereon;

FIG. 3 is a view partly in section of the product conveyor illustrated in FIG. 2, taken along lines 3—3 thereof; and FIG. 4 is a view partly in section of the conveyor shown in FIG. 3, taken along lines 4—4 thereof.

DESCRIPTION OF THE PREFERRED EMBODIMENT

Referring now to the drawings, there is disclosed a product source 50 which may be an oven or a machine for producing a product having a conveyor 51 extending therefrom for conveying product in the direction of the arrow 52. A second product source 55 is also disclosed having a conveyor 56 extending therefrom for conveying product in the direction of the arrow 57. The two conveyors 51 and 56 are constructed and arranged to convey product in side-by-side relation to a treatment facility 60.

The treatment facility 60 may be a freezer, if it is necessary to freeze the product, or for that matter, may be an oven or some other treatment facility for the product. The product is transported through the treatment facility 60 in the direction of the arrow 61 to the conveyor 65.

More particularly, product is conveyed from the treatment facility 60 to an infeed end 66 of the conveyor 65, the conveyor also having an outfeed end 67. The conveyor 65 includes two spaced-apart longitudinally extending support brackets 70 each having a mounting block 71 fixedly secured to the top of each support bracket as by welds 72. Each of the support brackets 70 is mounted to a side frame 75, the side frames 75 being identical in construction and arranged in facing relationship. Each of the side frames 75 has a straight mounting portion 76 integral with curved lower portion 77 having an upturned end 78. A lower rail 79 is positioned on the upturned end 78 and extends the entire length of the side frame 75 which is coextensive with the length of the conveyor 65. The side frame 75 further includes an upper inwardly angled portion 81 having an upturned end 82 on which is positioned an upper rail 84. The upper rail 84 also extends the entire length of the side frame 75 and, therefore, extends from the infeed end 66 to the outfeed end 67 of the conveyor 65.

Intermittently along the length of the conveyor 65 from the infeed end 66 to the outfeed end 67 there are provided transversely extending cross members 90 which may be of cylindrical construction. Each of the cross members 90 is provided with mounting flanges 91 at each end thereof which are mounted to the respective side frames 75 by means of bolts 92 and nuts 93, the mounting flanges 91 and the nuts and bolts 92 and 93 associated therewith serving to mount each of the support brackets 70 to the associated side frame 75. Each of the cross members 90 is provided with a center plate 95 extending upwardly therefrom and fixedly mounted thereto. The center plate 95 has mounted thereon a center guide 96 having a center rail 97 mounted thereon, which rail extends the entire length of the conveyor 65. The center rail 97 is fixedly mounted to the center guides by means of bolts 98 and nuts 99.

It is seen, therefore, that the conveyor 65 is provided with two side frames 75 having spaced-apart upper rails 84 positioned near the support brackets 70 and a center rail 97, all of the rails lying in a horizontal plane, extending from the infeed end 66 to the outfeed end 67 of the conveyor. Also, provided are spaced-apart return rails 79 positioned beneath the individual cross members 90 and also extending from the infeed end 66 to the outfeed end 67 of the conveyor 65.

A plurality of rods 105 extend transversely across rails 84 and are interconnected by links 107 and are moved from the infeed end 66 to the outfeed end 67 by a drive mechanism (not shown). The rods 105 form an endless belt conveyor having an upper reach (shown in full line in FIG. 3 and a return reach shown in phantom line). Each of the rods 105 is provided with an end bushing 106 having connecting links 107 and an end cap 108, the bushing 106 being adapted to ride on the upper rails 84 during movement from the infeed end 66 to the outfeed end 67 and on the lower rails 79 during the return from the outfeed end 67 to the infeed end 66. Each of the rods 105 is provided with center links 111 or spacers adapted to ride on the rail 97.

Each of the rods 105 is provided with two product supports so as to form a split conveyor as particularly seen in FIGS. 2 and 3 of the drawings. A product positioning support 115 is formed of a tube 116 rotatably mounted on the rod 105, the tube 116 being provided with end bearings 117. The product positioning support 115 extends from the center links or spacer 111 to the associated end bushing 106. As shown, product positioning supports 115 form a group 130 of product positioning supports, for a purpose hereinafter set forth.

Each of the rods 105 also carries a product carrying support 125 formed of a tube 126 having end bearings 127 and a spacer 128 fixedly mounted to the rod 105. The spacer 128 serves to maintain product carrying support 125 in position on the rod 105 in abutting relation to the center links or spacer 111 and spaced inwardly from the associated end bushing 106. Product carrying supports 125 form a group 135 of product carrying supports.

Accordingly, it is seen that each rod 105 carries a product positioning support 115 and a product carrying support 125 with the split conveyor forming two product lanes 175 and 180 with each lane having alternate groups 130 of product positioning supports 115 and groups 135 of product carrying supports 125. As will hereinafter be explained, the product carrying supports 125 carry the product 170 from the infeed end 66 to the outfeed end 67 of the conveyor 65 while the product positioning supports 115 position the product 170 on the product carrying supports 125.

Means 140 are provided on each of the mounting brackets 154 to rotate the product positioning supports 115 to position the product 170 on an adjacent group 135 of product carrying supports 125. More particularly, each of the means 140 includes a pad 141 having a lower surface 142 positioned above the rods 105 frictionally to engage the tubes 116 of the product positioning supports 115. The pads 141 are positioned near the outside bushing 106 of the rods 105 so that the surface 142 will contact the tube 116 of the product positioning supports 115 but will not contact the product carrying supports 125. The pads 141 are maintained in position by the mounting bracket 154 having a flange 146 fixedly connected to the mounting blocks 71 by bolts. The mounting bracket 154 also has a horizontally extending mounting flange 151, the mounting flanges 146 and 151 being interconnected by a brace 145. The mounting flanges 146 and 151 and the mounting bracket 154 may be a one-piece construction.

As may be seen, the conveyor 65 is provided with two longitudinally extending product lanes 175 and 180, each being comprised of alternate groups 130 of product position supports 115 and groups 135 of product carrying supports 125. Since each rod 105 carries a product positioning support 115 and a product carrying support 125, the groups of product positioning supports 130 and the groups of product carrying supports 135 are staggered with respect to the product lanes 175 and 180.

In operation, the product 170 fed onto the conveyor 65 at the infeed end 66 which contacts a group 130 of product positioning supports will be moved backward or toward the infeed end 66 until the product 170 contacts a group 135 of product carrying supports 125 because the means 140 rotates each of the product positioning supports 115 in a direction opposite to the direction of travel of the conveyor 65. Since the product carrying supports 125 are not rotated by the means 140, they will carry the product 170 from the infeed end 66 to the outfeed end 67. Product 170 fed into the conveyor 65 at the infeed end 66 which comes in contact with a group 135 of product carrying supports 125 will be carried thereby to the outfeed end 67. As seen particularly in FIG. 2, each of the product lanes 175 and 180 delivers product 170 to the outfeed end 67 of the conveyor 65 sequentially with product being delivered first from one of the lanes and then from the other.

As shown in the drawings, a combining conveyor 160 is provided at the outfeed end 67 of the conveyor 65, which merging conveyor first receives product from one of the lanes 175 and 180 and then from the other lane. The combining conveyor 160 may be of a commercially available type horizontal product combiner, such as Velten & Pulver's Select-O-Flow Combiner. This unit has pre-routed slat groups timed with conveyor 65 so that the slat groups arrive at the infeed end of the combining conveyor 160 simultaneously with the arrival at the outfeed end 67, of conveyor 65, of the product carrying supports 125. This then puts product 170 on alternate slat groups of combiner 160. The combiner 160 thereafter merges the two lanes of product into one and since the product is delivered sequentially, the product 170 never comes into contact with each other and product accumulation is prevented. A single lane conveyor 165 positioned at the outfeed end of the merging conveyor 160 receives the product 170 now arranged in single row configuration and conveys the product for further processing.

It is seen, therefore, that there has been provided a system which includes a conveyor 65 for receiving two lanes of product 170 fed at random, which conveyor 65 arranges the product in two lanes 175 and 180 with the product being staggered and delivered sequentially at the outfeed end 67, first from one lane and then the other. The system also includes a merging conveyor 160 at the outfeed end 67 for receiving the sequentially delivered product 170 from the two lanes 175 and 180 and for merging the two lanes of product into one without product accumulation and all the problems attendant thereto. The system also contains a single lane conveyor 165 for conveying the product arranged in single row configuration from the merging conveyor 160.

While there has been disclosed a system for receiving randomly delivered product 170 in two lanes, it is clear that slight modification of the disclosed system will permit product to be received from four lanes or from eight lanes and, thereafter to be combined from eight lanes to four lanes to two lanes to one lane. Alternatively, multiple lanes of three, four, etc., may be arranged to deliver product sequentially with the above conveyor 65 being modified to handle three or four product lanes.

As disclosed, the apparatus includes groups 130 of product positioning supports and groups 135 of product carrying supports, each comprised of eight individual supports. Clearly, the number of supports used to form each group of supports depends on the size of the product 170 to be conveyed. Similarly, the method of contacting only product positioning supports and not product carrying supports with the means 140 may be different. For instance, the product positioning supports can be of a larger diameter than the product carrying supports. The important concept being the provision of multiple lanes 175 and 180 which are comprised of groups 130 of product positioning supports and groups 135 of product carrying supports with the groups being staggered.

While there has been described what is at present considered to be the preferred embodiment of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. Apparatus for staggering product delivered to multiple adjacent product lanes, said apparatus comprising a plurality of longitudinally extending product lanes each comprised of groups of rotatable product carrying supports and groups of rotatable product positioning supports forming an endless conveyor having an infeed end and an outfeed end, said conveyor including a plurality of transversely extending rods each carrying a product carrying support and a product positioning support, each group of product carrying supports being transversely aligned with at least one group of product positioning supports, and mechanism for rotating said product positioning supports to position product onto an adjacent group of product carrying supports, whereby product fed onto a group of said product positioning supports is transported thereby to an adjacent group of product carrying supports for transport thereon to said outfeed end and product fed onto a group of said product carrying supports is transported thereon to said outfeed end, said product carrying supports delivering product to said outfeed end sequentially from each product lane.

2. The apparatus set foth in claim 1, wherein there are two product lanes.

3. The apparatus set forth in claim 1, wherein each product positioning support is rotatably mounted on a transversely extending rod.

4. The apparatus set forth in claim 1, wherein each product carrying support is fixedly mounted on a transversely extending rod.

5. The apparatus set forth in claim 1, wherein each product lane has alternate groups of product carrying supports and product positioning supports.

6. The apparatus set forth in claim 1, and further including mechanism frictionally engaging said product positioning supports during movement thereof away from said infeed end for rotating said product supports to position product onto an adjacent group of product carrying supports.

7. The apparatus set forth in claim 6, wherein said mechanism frictionally contacts said product positioning supports during movement thereof from said infeed end to said outfeed end.

8. The apparatus set forth in claim 6, wherein said product positioning supports are rotated in a direction opposite to the direction of travel of said endless conveyor.

* * * * *